T. S. MILLER.
CABLEWAY.
APPLICATION FILED MAY 21, 1908.
943,032.
Patented Dec. 14, 1909.
6 SHEETS—SHEET 1.
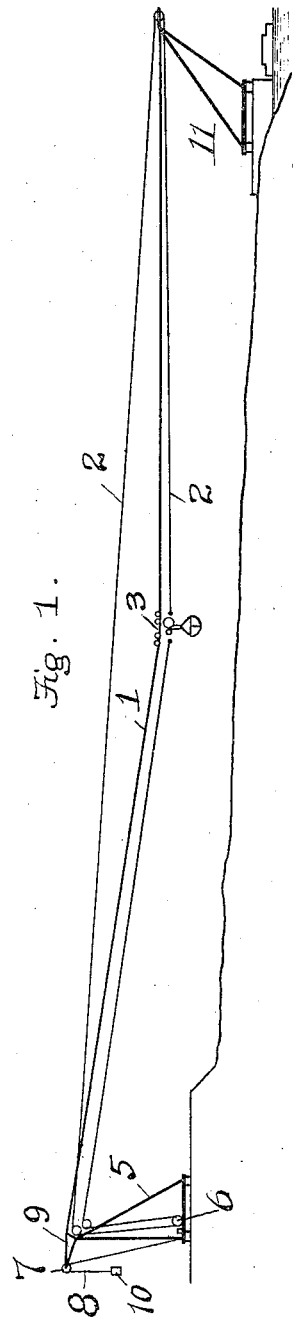
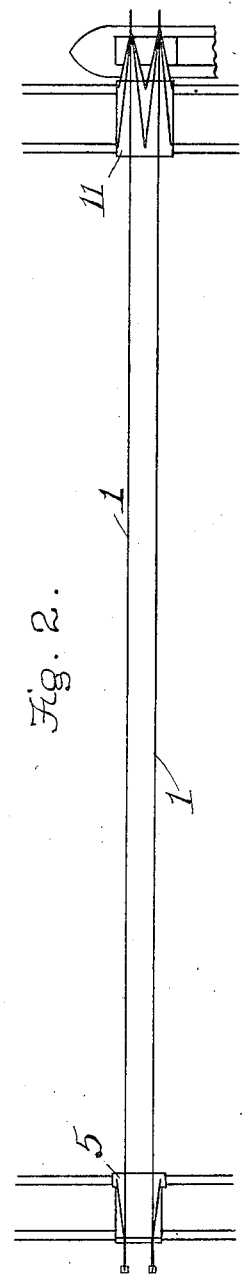
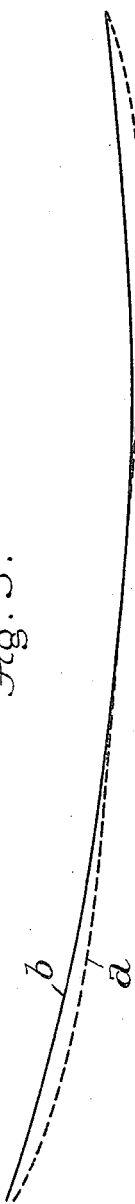

T. S. MILLER.
CABLEWAY.
APPLICATION FILED MAY 21, 1908.
943,032.
Patented Dec. 14, 1909.
6 SHEETS—SHEET 2.
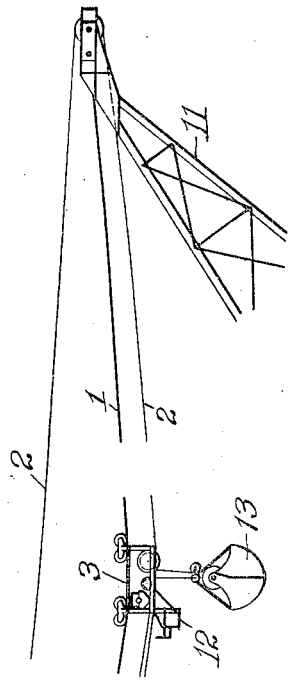
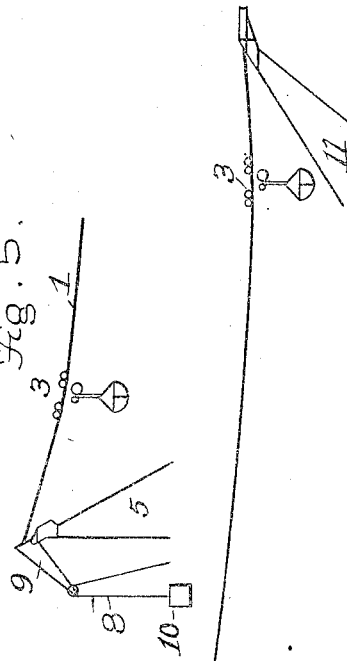
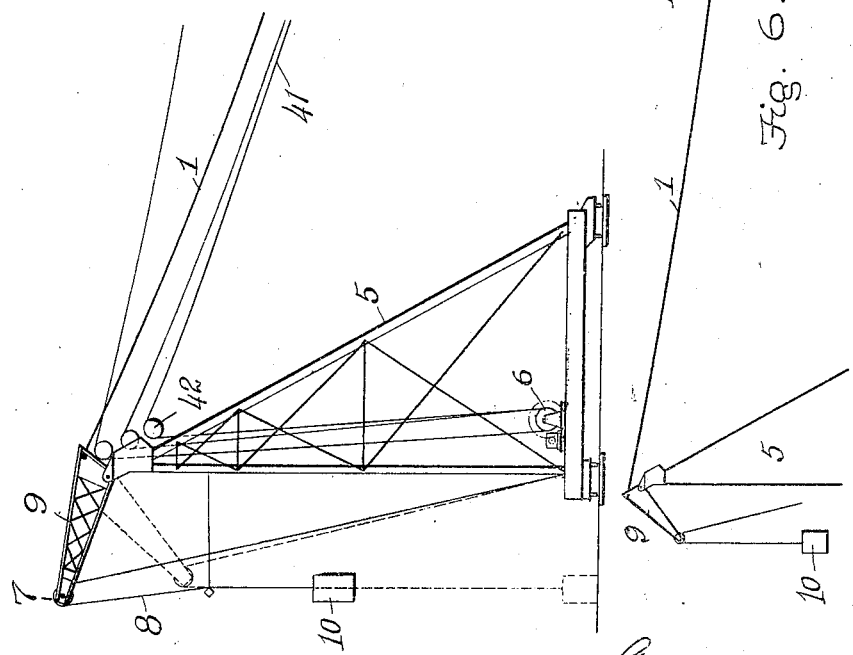
Witnesses
Inventor
Thomas Spencer Miller
By his Attorneys

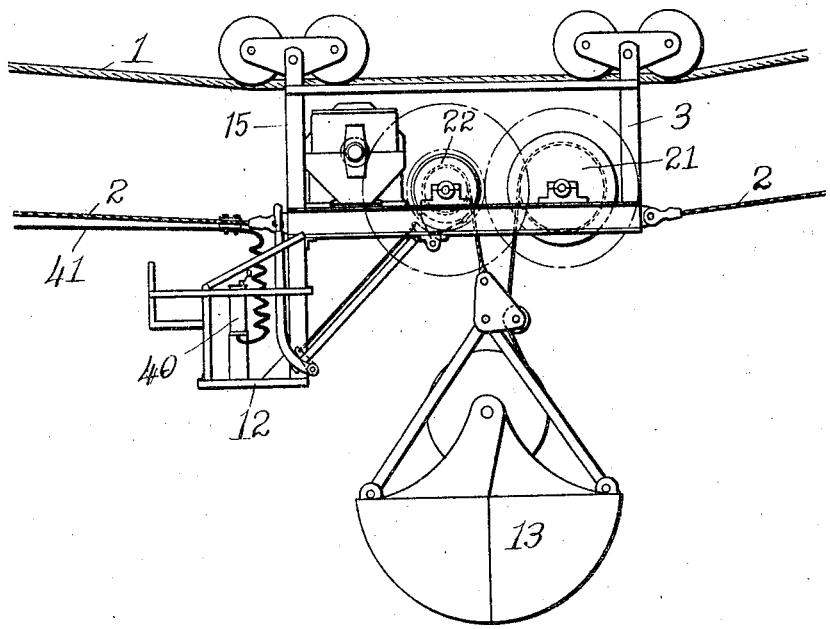
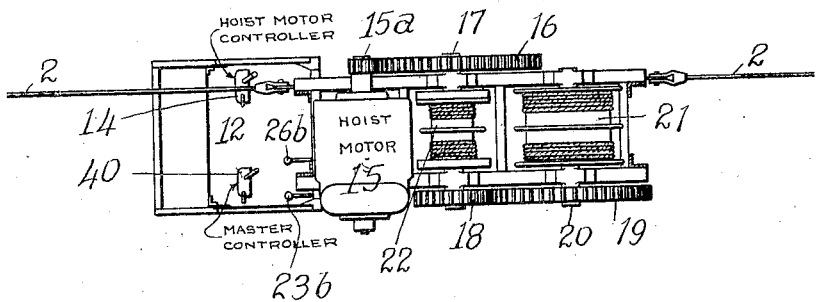

T. S. MILLER.
CABLEWAY.
APPLICATION FILED MAY 21, 1908.

943,032.

Patented Dec. 14, 1909.
6 SHEETS—SHEET 4.

Witnesses
Inventor
Thomas Spencer Miller
By his Attorneys

T. S. MILLER.
CABLEWAY.
APPLICATION FILED MAY 21, 1908.

943,032.

Patented Dec. 14, 1909.
6 SHEETS—SHEET 5.

UNITED STATES PATENT OFFICE.

THOMAS SPENCER MILLER, OF SOUTH ORANGE, NEW JERSEY.

CABLEWAY.

943,032.　　　　　Specification of Letters Patent.　　Patented Dec. 14, 1909.

Application filed May 21, 1908. Serial No. 434,068.

*To all whom it may concern:*

Be it known that I, THOMAS SPENCER MILLER, a citizen of the United States, and a resident of South Orange, county of Essex, and State of New Jersey, have invented a new and useful Improvement in Cableways, of which the following is a specification.

My invention relates to cableways and it consists in certain novel parts and combinations of parts pointed out in the claims concluding these specifications.

In the accompanying drawings, I have shown my invention embodied in the form which is at present preferred by me but it will be understood that various modifications and changes may be made in the structure without departing from the spirit of my invention and without exceeding the scope of my several claims.

Figure 9:
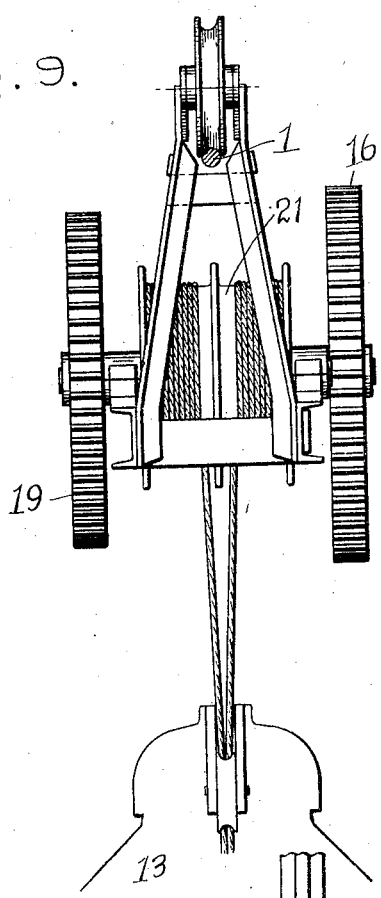
Figure 10:
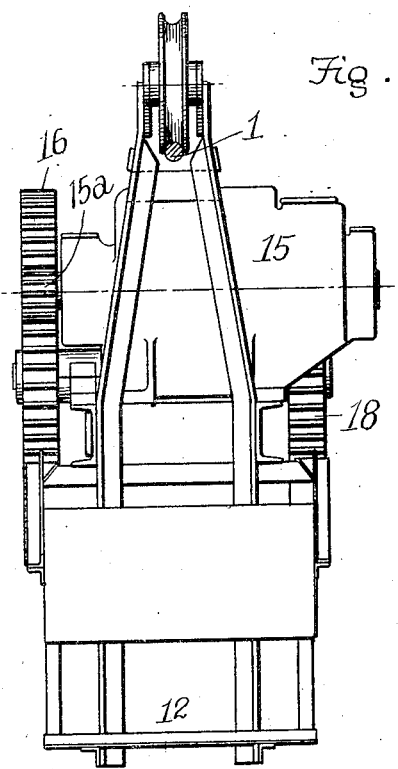
Figure 11:
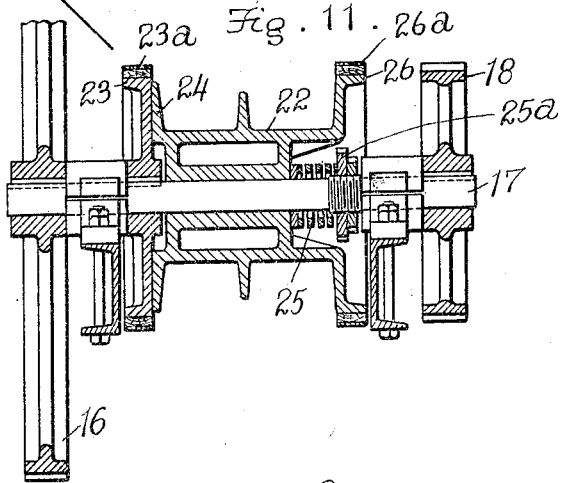
Figure 12:
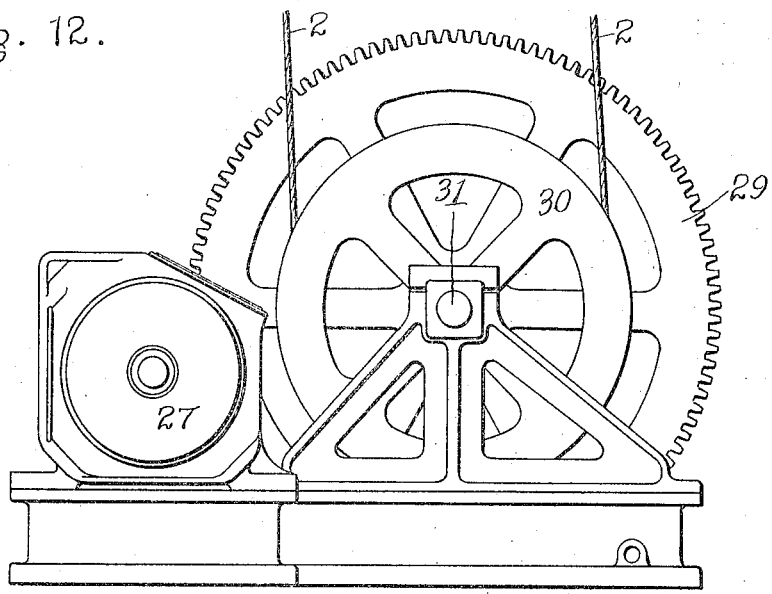
Figure 13:
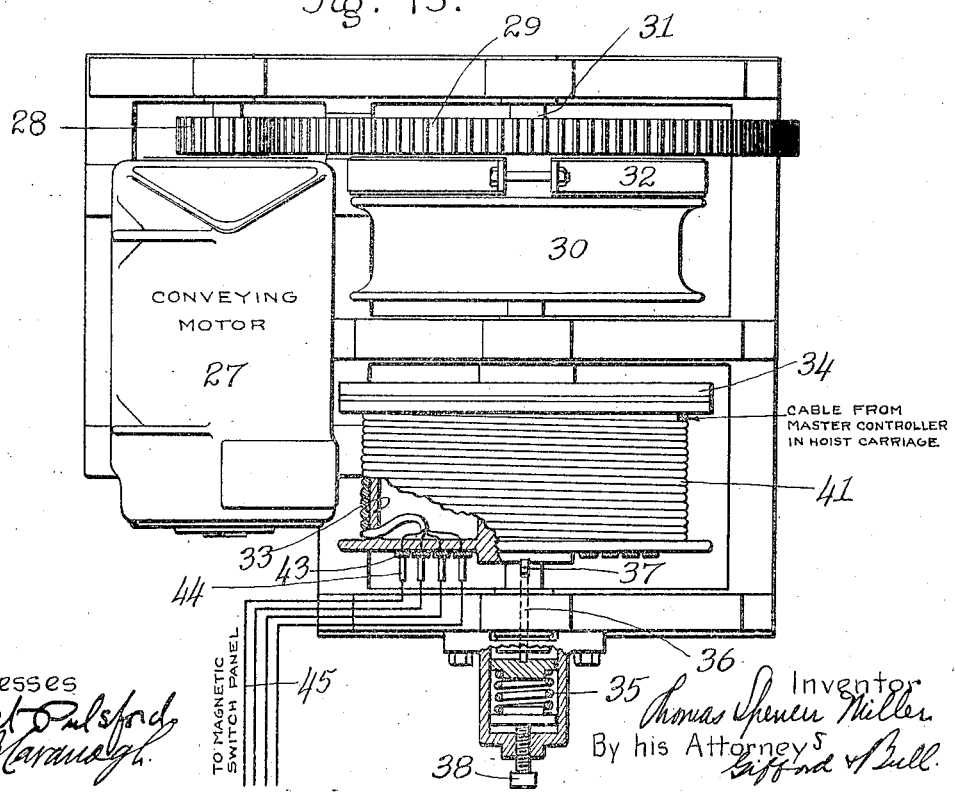

Figure 1 of the accompanying drawings is a diagrammatic side view of the cableway. Fig. 2 is a top view. Fig. 3 shows the path or trajectory of the loaded carriage in its passage over the cableway; the full line showing its path when means, such as are herein described, for varying the effective length of the span, are employed, and the dotted line showing the path of the carriage when such means are not employed—that is to say, when the cable has its ends fixed. Fig. 4 shows more in detail the head tower, the load carriage, the upper portion of the tail tower and the take-up or compensating device pivoted to the top of one of the towers. Fig. 5 shows diagrammatically the position of the compensating device when the load carriage approaches near to the head tower. Fig. 6 shows diagrammatically the position of the compensating device when the load carriage approaches near to the tail tower. Figs. 7 and 8 are, respectively, a side and top view of the load carriage in detail. Figs. 9 and 10 are, respectively, end views taken from opposite ends of the load carriage. Fig. 11 is a sectional view through one of the drums carried by the load carriage. Fig. 13 is a plan view partly in section of the conveying machine. Fig. 12 is an elevation of the same with the electrical cable reel omitted. Figs. 14, 15, 16, and 17, represent diagrammatically alternative forms of power-multiplying-compensating-devices.

1 is the main cable.

3 is the load carriage.

2, 2, is an endless conveying rope attached to the load carriage and wrapped around a drum 6 actuated by the conveying engine which is located at the head tower 5. This head tower 5 carries a bell-crank lever 9, pivoted thereto, to the short arm of which lever the main cable 1 is attached. The long arm of this lever carries a pulley 7 over which a rope 8 carrying a weight 10 runs, or the weight may be attached directly to the long arm of the lever.

11 is the tail tower.

The above parts are shown duplicated side by side in Fig. 2 forming a duplex cableway in which the two parts coöperate with each other in operation to eliminate certain strains upon the towers in the manner hereinafter more fully set forth and constitute an important feature of my invention.

Whether the cableway be single or duplicated, the effect of the bell-crank-lever 9 which acts as a compensating device, is to increase and decrease the effective length of the span of the cable as the load upon the cable varies either in position or weight. In fact, the tension of the cable remains practically constant at all loads and at all positions of the load but the effective length of span and the deflection or sag in the cable varies as the load varies in weight or position. As illustrated in Fig. 3, if no such compensating device be employed, the path which the load carriage would follow when passing from one tower to the other is approximately that shown by the dotted line $a$ and the load must, therefore, encounter a relatively steep grade as it approaches the towers. When the compensating device is employed, however, the load will follow approximately the path shown by the full line $b$, because as the load approaches either tower the compensating device will take up the slack of the cable and diminish the grade which the carriage has to climb in approaching the tower. When the load carriage is at the middle of the span, the weight 10 of the compensating device will be raised to the maximum extent and this weight will fall as the load carriage approaches either tower.

By having the compensating device in the form of the bell-crank-lever 9 actuated by suitable means (shown in the drawings as being a weight and pulley) attached to the long arm thereof, it constitutes a power-multiplying-compensating-device, the power of the weight in taking up the slack being multiplied first by the difference in the lengths of the two arms of the bell-crank-lever, and, second, by the use of the pulley. Multiplication of the power by these or other means not only enables me to use a relatively light weight to accomplish the desired result, but it also diminishes the effect of momentum and inertia as the elevation of the weight changes.

Referring to Fig. 4, in which the parts are shown more in detail, the position of the bell-crank-lever 9 and the weight 10 when the carriage is at the middle of the span, is shown in full lines, while the position of the said lever and its weight when the load carriage is near a tower is shown in dotted lines.

Figs. 5 and 6 show diagrammatically the position of the compensating device when the carriage is near either of the towers. It will be observed that the position of the bell-crank-lever is the same when the load carriage approaches either the head tower, as in Fig. 5, or the tail tower, as in Fig. 6.

Figure 14:
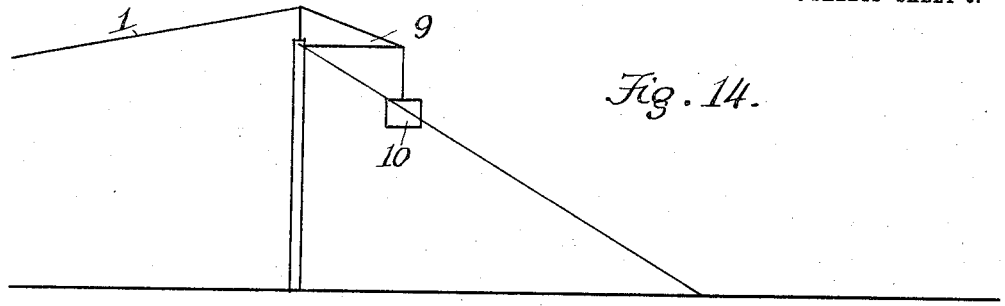
Figure 15:
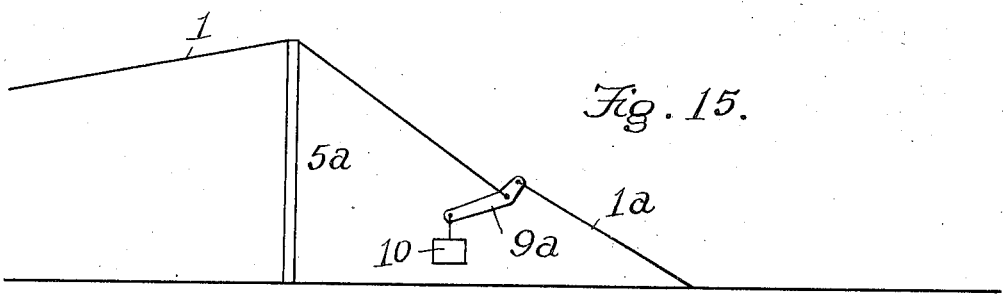
Figure 16:
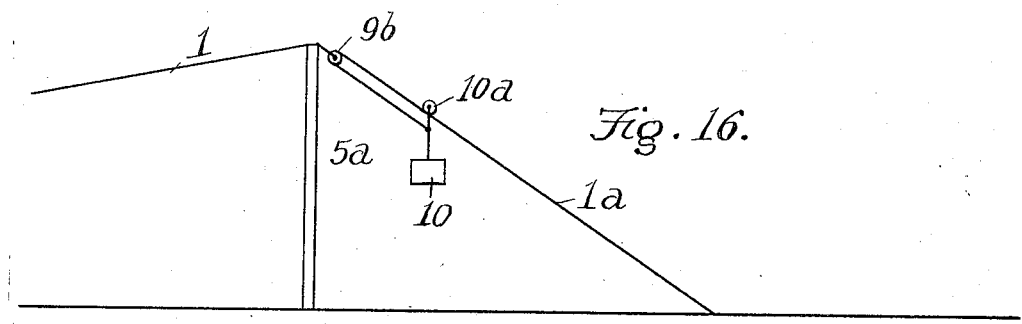
Figure 17:
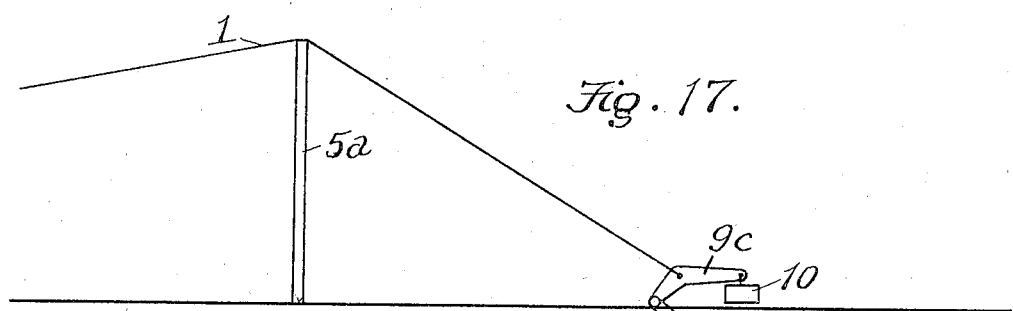

As alternative forms of power-multiplying-compensating-devices for that shown in Fig. 1, I show in Fig. 14, a bell-crank-lever 9 having the weight 10 suspended directly from its long arm and pivoted to the top of a fixed tower; in Fig. 15, the cable 1 extends over the top of an A-frame 5$^a$, (the top of which is free to vibrate) and is secured as shown to a lever 9$^a$ fulcrumed on the end of a cable 1$^a$, the other end of which cable 1$^a$ is anchored to the ground, and the opposite end of which lever 9$^a$ carries the weight 10; in Fig. 16, the cable 1 extends over the A-frame 5$^a$, (the top of which is free to vibrate) and is secured to the block of a sheave 9$^b$ around which passes the cable 1$^a$ having one end anchored to the ground and the opposite end secured to the trolley 10$^a$ supporting the weight 10; in Fig. 17, the cable 1 passes over the A-frame 5$^a$, (the top of which is free to vibrate) and is secured, as shown, to the lever 9$^c$ one end of which is connected with the anchorage 1$^b$ by the link 1$^c$, and the other end of which lever supports the weight 10.

All of these forms of power-multiplying-compensating-devices constitute safety devices because they yield to any increase of load and, therefore, prevent a breaking strain being exerted upon the cable. Therefore, the power-multiplying-compensating-device, whichever its form, will be so proportioned to the length and height of the cable that within its range of movement it may afford sufficient slack of the cable to permit the load carriage to rest upon the ground or, at any rate, to permit sufficient sag or deflection of the cable to keep within the element of safety. Whichever of these forms of power-multiplying-compensating-device is employed in the duplex cableway shown in Fig. 2, the constancy of the strain maintained thereby on each of the cables will prevent the twisting or warping action produced upon the towers by ordinary duplex cableways due to the fact that the relative strain of the two ordinary cableways upon opposite corners of the tower constantly varies.

The operator who controls the raising and lowering of the bucket 13 is on the platform 12 of the load carriage. Within his reach are two electrical controllers, namely: the hoist controller 14 controlling the hoist motor 15, and the master controller 40 controlling the conveyer motor 27. This I regard as an exceedingly important feature of my invention in that it enables a single operator to control all movements of the load, inclusive of the movements for conveying it as well as the movements for hoisting or lowering it.

The electrical motor 15 controlled by the controller 14 carries a pinion 15$^a$ meshing with a gear wheel 16 fast on shaft 17 on the opposite end of which shaft is fixed a gear wheel 18 meshing with a gear 19 fixed on shaft 20. Rope drum 21 is keyed to the shaft 20. Rope drum 22 and its appurtenances on shaft 17 are shown in section in Fig. 11.

23 is a brake wheel keyed to shaft 17 and coöperating with a band-brake 23$^a$ and also with a friction disk 24 on drum 22 which is revoluble on the shaft 17 and which at its opposite end carries a brake flange 26 coöperating with the band-brake 26$^a$.

25 is a coil spring interposed between the end of the drum 22 and a collar 25$^a$ adjustably fixed on the shaft 17. The spring 25 presses the friction disk 24 against the face of the wheel 23. The band-brakes 23$^a$, 26$^a$ are independently operated by the levers 23$^b$ and 26$^b$ within reach of the operator on platform 12. By operating the band-brake 23$^a$ the load hoisted on drum 21 is sustained and controlled in lowering. By operating the band-brake 26$^a$, the drum 22 can be held at will. As shown, both the drum 22 and the drum 21 are provided with a dividing flange in the middle and with a plurality of ropes leading from each to the bucket for the purpose of balancing the carriage for all positions of the load.

Starting with the bucket lowered and open, the operator by means of the controller 14, starts the motor 15 in the proper direction at the same time applying the brake 26$^a$. The revolution of the drum 21 closes the bucket and hoists it. The operator releases brake 26$^a$ and the drum 22 revolving takes in the slack as the hoist proceeds.

The conveyer motor 27 is located at the head tower and carries the pinion 28 meshing with the gear wheel 29 fast on shaft 31 keyed to which is the rope drum 30 around which the endless conveyer rope 2 is wrapped a sufficient number of times to give the necessary traction for moving the load carriage on the main cable.

32 is a brake-band of ordinary construction for holding the drum when the motor is not running and for checking the speed in stopping.

33 is a drum revolubly mounted on the shaft 31 and pressed axially against the friction disk 34 by a coil spring 35, acting through a central pin 36 and cross-key 37.

38 is an adjusting screw whereby the tension of the spring 35 may be adjusted to secure the desired amount of friction against the disk 34.

The master-controller 40 is connected with the conveyer motor 27 as follows: 41 is an insulated electric cable extending from the master-controller 40 along the cableway to the head tower, thence over the sheave 42 down to the drum 33 around which it is coiled. The several wires that it contains are passed out through the end of the drum 33 and connected with a corresponding number of terminal rings 43 with each of which a brush 44 coöperates. These brushes are electrically connected by the wires 45 with a magnetic switch panel of well known construction through which the conveyer motor is controlled through proper connections.

By the electrical connections described between the master-controller 40 and the motor 27, the operator on the load-carriage-platform 12 can cause the load carriage to travel as desired. The drum 33 will automatically pay out or pull in the electric cable 41 in concert with the movement of the conveyer rope 2. If, as sometimes happens, there is a slip of the conveyer rope on the surface of drum 31, there will be a corresponding slip between the drum 33 and friction disk 34 and thus the proper relationship between the conveyer rope and the electric cable 41 will be automatically maintained. It will now be observed that, while there may be only a single operator located on the load carriage, it is propelled by a stationary motor and the hoist is actuated by an independent motor traveling on the load carriage. The centralized control of both the hoisting and conveying not merely reduces the cost of labor, but greatly facilitates the certainty, promptness, speed and safety of operation. The weight of the conveyer motor is not imposed in the cable. The tractive function is not dependent upon friction between the wheels of the load carriage and the cable but upon the positive pull of the endless rope which is very important on steep grades. The hoisting motor being relatively light does not impose undue weight on the cable and its location on the load carriage avoids complications involved in locating it elsewhere.

The means herein shown and described whereby the effect on the cable of variations in weight or position of the load carriage may be compensated for is made the subject of a divisional application No. 486731 filed March 30, 1909 and is therefore not claimed herein excepting in combination with other features as specified in the claims hereof.

Having thus described my invention, what I claim is:

1. In a conveying apparatus, in combination, an elevated trackway, a load-carriage thereon, a conveyer-motor located off the load-carriage, a conveyer rope whereby the conveyer movements of the load-carriage are imparted from the conveyer-motor, a hoist-motor on the load-carriage, an operator station on the load-carriage and means whereby both the conveyer-motor and the hoist-motor may be controlled from said operator station.

2. In a conveying apparatus, in combination, an elevated trackway, a load-carriage thereon, an electrically controlled conveyer-motor located off the load-carriage and an electrical connection extending from the load-carriage along the trackway whereby said conveyer-motor is controlled.

3. In a conveying apparatus, in combination, an elevated trackway, a load-carriage thereon, an electrically controlled conveyer-motor located off the load-carriage and an electrical connection extending from the load-carriage along the trackway whereby said conveyer-motor is controlled and a take-up whereby said electrical connection is taken up or paid out during the conveyer movements of the load-carriage.

4. In a hoisting and conveying apparatus, in combination, a trackway, a load-carriage thereon, a stationary conveyer-motor, a hoist-motor on the load-carriage, an operator station on the load-carriage provided with means for controlling both motors and a take-up whereby the connection from said operator station to said conveyer-motor is taken up and paid out during the conveyer movements of the load-carriage.

5. In a conveying apparatus, in combination, a trackway, a load-carriage, a stationary conveyer-motor, a traction cable and an electric cable extending from said motor to the load-carriage and means whereby they are hauled in and paid out at a determined relationship with each other.

6. In a conveying apparatus, in combination, a trackway, a load-carriage, a stationary conveyer-motor, a traction cable and an electric cable extending from said motor to the load-carriage and means whereby they are hauled in and paid out at a determined relationship with each other and means whereby the actuator of the electric cable automatically adjusts itself to any slip in the actuation of the traction cable.

7. In a hoisting and conveying apparatus, in combination, an elevated trackway, a load-carriage thereon, a conveyer actuator adjacent to one end of the trackway, an endless conveyer rope having its opposite ends secured to the load-carriage and extending from the conveyer-motor across the span, a hoist-motor on the carriage and a single operator station from which both of said motors are controlled.

8. The combination of a cableway, a load-carriage, means for conveying said carriage, which means comprise a stationary motor and suitable connections between said motor and said carriage, and means for hoisting the load, which means comprise a motor carried on the load-carriage.

9. The combination of a cableway, means for varying the effective length of the cableway span, a load-carriage, means for conveying said carriage, which means comprise a stationary motor and suitable connections between said motor and said carriage, and means for hoisting the load, which means comprise a motor carried on the load-carriage.

10. In a hoisting and conveying machine, a main cable or trackway, a load-carriage to travel thereon containing hoisting mechanism and a prime mover therefor, a traversing rope or ropes for propelling said load-carriage along the trackway, means for operating the traversing rope or ropes located near the terminal of such trackway.

11. In a hoisting and conveying machine, a main cable or trackway, a load-carriage to travel thereon containing independently operated hoisting mechanism, a traversing rope or ropes for propelling the carriage along the trackway, stationary means for operating the traversing ropes.

12. In a hoisting and conveying machine, a main cable or trackway, a carriage to travel thereon containing hoisting mechanism, a prime mover therefor adapted to carry a man to operate the same, a traversing rope or ropes for propelling the carriage along the trackway, stationary means for operating the traversing ropes.

13. In a cableway, a main cable, a carriage to travel thereon containing an electric motor and hoisting mechanism, a traversing rope for propelling the carriage along the cable, stationary means for operating the traversing ropes.

In testimony whereof, I have hereunto signed my name in the presence of two subscribing witnesses.

THOMAS SPENCER MILLER.

Witnesses:
ERNEST PULEFORD,
L. G. RUGGLES.